United States Patent [19]

Chevallier et al.

[11] Patent Number: 5,360,836
[45] Date of Patent: Nov. 1, 1994

[54] PROCESS FOR THE PRODUCTION OF COATINGS BY RADIATION CROSS-LINKING

[75] Inventors: François Chevallier, Bergerac; Sammy Chevalier, Paris, both of France

[73] Assignee: Societe Nationale des Poudres et Explosifs, Paris, France

[21] Appl. No.: 35,491

[22] Filed: Mar. 22, 1993

Related U.S. Application Data

[63] Continuation of Ser. No. 772,649, Oct. 9, 1991, abandoned, which is a continuation of Ser. No. 522,453, May 14, 1990, abandoned, which is a continuation of Ser. No. 104,048, Oct. 2, 1987, abandoned.

[30] Foreign Application Priority Data

Oct. 2, 1986 [FR] France .................. 86 13726

[51] Int. Cl.$^5$ .................. C08F 2/50; C08F 226/00; C08F 226/06
[52] U.S. Cl. .................. 522/96; 427/520; 522/103; 522/107; 522/167; 522/174; 526/260; 526/301
[58] Field of Search .................. 522/96, 103, 107, 167, 174, 526/301, 260

[56] References Cited

U.S. PATENT DOCUMENTS

| | | | |
|---|---|---|---|
| 2,718,516 | 11/1952 | Bortnick | 526/312 |
| 2,882,260 | 4/1959 | Bartl et al. | 526/301 |
| 3,190,885 | 6/1965 | Hickner | 524/95 |
| 4,287,323 | 9/1981 | Tefertiller et al. | 526/301 |
| 4,317,858 | 3/1982 | Sattler | 522/103 |
| 4,321,404 | 3/1982 | Williams | 526/96 |
| 4,395,444 | 7/1983 | Das | 524/157 |
| 4,481,258 | 11/1984 | Sattler et al. | 522/96 |
| 4,605,719 | 8/1986 | Peelen | 524/553 |
| 4,672,098 | 6/1987 | Herweh | 526/268 |
| 4,755,564 | 7/1988 | Lindner | 525/293 |

FOREIGN PATENT DOCUMENTS

| | | |
|---|---|---|
| 0168226 | 1/1986 | European Pat. Off. |
| 1090805 | 4/1955 | France. |
| 980393 | 1/1965 | United Kingdom. |

*Primary Examiner*—Marion E. McCamish
*Assistant Examiner*—Arthur H. Koeckert
*Attorney, Agent, or Firm*—Burns, Doane, Swecker & Mathis

[57] ABSTRACT

The subject of the invention is a process for the production of coatings by radiation crosslinking of compositions containing a resin which can be cured by the polymerization of the double bonds $>C=CH_2$ and a reactive diluent system containing at least one reactive diluent corresponding to the general formula (I)

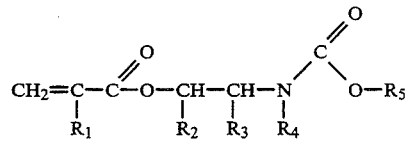

in which
$R_1 =$ H, $CH_3$,
$R_2$ and $R_3 =$ H, $C_1$–$C_4$-alkyl chain or form an alkylene ring containing 5 or 6 carbon atoms,
$R_4 =$ H, $C_1$–$C_4$-alkyl chain, phenyl,
$R_5 = C_1$–$C_{10}$ aliphatic chain, $C_5$–$C_6$ alicyclic chain, or $C_1$–$C_4$ alkyl chain substituted with an aryl or aromatic heterocyclic group,
or $R_4$ and $R_5$ form a 5- or 6-membered ring.

One preferred compound (I) is to the acrylate of isopropyl beta-hydroxyethylcarbamate.

5 Claims, No Drawings

PROCESS FOR THE PRODUCTION OF COATINGS BY RADIATION CROSS-LINKING

This application is a continuation of application Ser. No. 07/772,649, filed Oct. 9, 1991, which is a continuation of application Ser. No. 07/522,453, filed May 14, 1990, which is a continuation of application Ser. No. 07/104,048, filed Oct. 2, 1987, all now abandoned.

The subject of the invention is a process for the production of coatings by radiation crosslinking of compositions containing a resin which can be cured by the polymerization of the double $>C=CH_2$ and a reactive diluent system. It also relates to the acrylate of isopropyl beta-hydroxyethylcarbamate, a new compound which may especially be employed in the production of coatings by radiation crosslinking.

"Coating" means a polymerized film coating a support such as wood, paper, a metal, a plastic or inorganic substance.

"Resin which can be cured by the polymerization of the double bonds $>C=CH_2$" means an oligomer or a mixture of oligomers generally having at least one $>C=CH_2$ end group or side group, and which crosslinks through these groups by suitable radiation crosslinking means, especially photocrosslinking.

The compositions employed for the production of coatings combine such a curable resin with a reactive diluent system which enables, in a first stage, the viscosity of the composition to be reduced, the above-mentioned resin being too viscous to be applied properly as a film on the support. In a second stage, the reactive diluent system takes part in the polymerization of the resin (copolymerization), which enables the desired mechanical properties to be obtained.

These reactive diluent systems, which are miscible with the resin, contain at least one diluent containing one or more unsaturations, which react with the double bonds of the resin.

The choice of the reactive diluent determines the physical and mechanical properties of the coating. For obvious reasons, this diluent must be of low volatility and non-toxic. Its reactivity with the resin must be high, especially for reasons which will be specified later.

Many reactive diluent systems have already been described in the literature. Reactive diluents may be classified into two groups: vinyl monomers and acrylic monomers.

The advantage of vinyl monomers such as N-vinylpyrrolidone is that they enable very reactive mixtures to be obtained. However, they are volatile and very often toxic. Additionally, with N-vinylpyrrolidone, which is the vinyl monomer most frequently employed, coatings which are relatively hygroscopic, which modifies their mechanical properties, are obtained.

Acrylic monomers do not have this disadvantage; however, they lead to less reactive mixtures than with N-vinyl-pyrrolidone.

For example, EP-147,172 describes a composition for the production of coatings by radiation crosslinking, containing, as reactive diluent, a carbamoyloxyalkyl acrylate which corresponds to the general formula

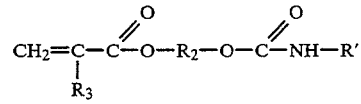

Monoacrylates such as E.D.G.A. of formula

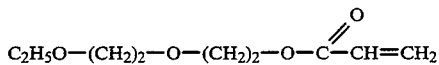

or, in order to increase the reactivity, multifunctional acrylates such as hexanediol diacrylate (HDDA) or trimethylolpropane triacrylate (TMPTA), are also very frequently employed.

In the field of processes for the production of coatings by radiation crosslinking, the person skilled in the art seeks reactive diluents which enable, on the one hand, the properties of use such as flexibility, adhesion and abrasion resistance to improved and, on the other hand, the reactivity of the resin-diluent system to be increased.

The Applicant Company has discovered in an unexpected way that the acrylates of hydroxyalkylcarbamate corresponding to the general formula (I)

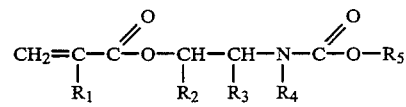

in which
- $R_1$ represents a hydrogen atom or a methyl group,
- $R_2$ and $R_3$ represent a hydrogen atom, or an alkyl chain containing 1 to 4 carbon atoms, or alternatively, $R_2$ and $R_3$ form, with the carbon atoms to which they are attached, an alkylene ring containing 5 or 6 carbon atoms,
- $R_4$ represents an hydrogen atom, or an alkyl chain containing 1 to 4 carbon atoms, or an optionally substituted phenyl group,
- $R_5$ represents an optionally substituted aliphatic chain containing I to 10 carbon atoms, or an optionally substituted alicyclic chain containing 5 or 6 carbon atoms, or an alkyl chain containing I to 4 carbon atoms, substituted with an aryl or aromatic heterocyclic group,
- or alternatively, $R_4$ and $R_5$ form, with the carbamate group to which they are attached, a substituted or unsubstituted 5- or 6-membered ring, may be employed as reactive diluents in the compositions for the production of coatings by radiation crosslinking and that, in comparison with similar acrylic esters or with the corresponding carbamoyloxyalkyl acrylates described in EP-147,172 they make it possible to achieve, on the one hand, a very significant increase in reactivity and, on the other hand, a better compromise between flexibility and hardness of the coating obtained, i.e. an increased flexibility at a given surface hardness or a greater hardness at a given flexibility. The increased reactivity results either in a decrease in the time of exposure to radiations required to achieve crosslinking, which is very significant, or, at a given exposure time, in a saving of initiator, which enables, in the case of use of systems such as benzophenone/tertiary amine or thioxanthone/tertiary amine, the amine content required to be reduced significantly. Now, it is well known that the presence of an amine causes a yellowing or a significant decrease in hardness of the coating, in addition to the fact that its odour is unpleasant.

The process according to the invention, for the production of coatings by radiation crosslinking of compositions containing a resin which can be cured by the polymerization of the double bonds >C=CH₂ and a reactive diluent system is characterized in that the said system contains at least one reactive diluent corresponding to the general formula (I)

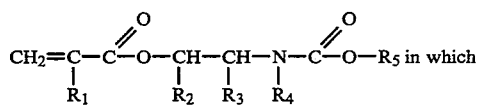

R₁ represents a hydrogen atom or a methyl group,

R₂ and R₃ represent a hydrogen atom, or an alkyl chain containing I to 4 carbon atoms, or alternatively, R₂ and R₃ form, with the carbon atoms to which they are attached, an alkylene ring containing 5 or 6 carbon atoms, R₄ represents a hydrogen atom, or an alkyl chain containing 1 to 4 carbon atoms, or an optionally substituted phenyl group, R₅ represents an optionally substituted aliphatic chain containing I to 10 carbon atoms, or an optionally substituted alicyclic chain containing 5 or 6 carbon atoms, or an alkyl chain containing 1 to 4 carbon atoms substituted with an aryl or aromatic heterocyclic group, or alternatively, R₄ and R₅ form, with the carbamate group to which they are attached, a substituted or unsubstituted 5- or 6-membered ring.

According to a variant of the invention, when R₅ represents an aliphatic chain, the latter contains at least one acrylic or methacrylic group.

According to a preferred variant, R₂ and R₃ represent a hydrogen atom.

According to other preferred variants, R₄ represents a hydrogen atom, or alternatively, R₄ forms, with R₅ and the carbamate group, an oxazolidone ring, or R₅ represents the group

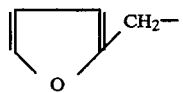

or alternatively, R₅ represents a benzyl group.

It is especially preferable that the reactive diluent is the acrylate of beta-hydroxyehtyloxazolidone of formula

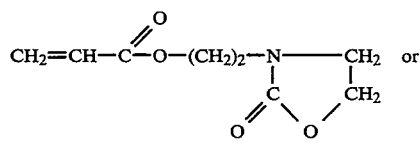

the acrylate of isopropyl beta-hydroxyethylcarbamate of formula

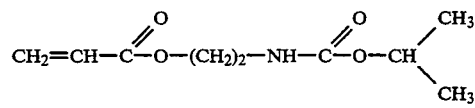

The latter compound is new, whereas, for example, GB-980,393 describes, inter alia, the use of the acrylate of beta-hydroxyethyloxazolidone in lubricating oils and FR-1,090,805 describes that of the methacrylate of ethyl beta-hydroxyethylcarbamate as intermediate of synthesis of isocyanate esters which can be polymerized.

The reactive diluents corresponding to the above-mentioned general formula (I), which can be used for implementing the process according to the invention for the production of coatings by radiation crosslinking, may be synthesized, for example, according to methods described in FR-1,090,805 and G8-980,393. Example 1 below illustrates such a synthesis.

The process according to the invention is implemented by operating according to conventional working procedure for the production of coatings by radiation crosslinking of compositions containing a resin which can be cured by the polymerization of the double >C=CH₂ and a reactive diluent system.

The proportion of constituents in the compositions may vary depending on the mechanical properties sought for the coating.

According to one variant of the invention, a reactive diluent corresponding to the general formula (I) mentioned above is employed as the only reactive diluent.

According to other variants, it may be employed mixed with at least one other reactive diluent, for example with an acrylic reactive diluent, or mixed with a non-reactive diluent.

A mixture of reactive diluents corresponding to the general formula (I) may also be employed.

The proportion of the different constituents per 100 parts by weight of the composition is generally within the following limits:
Resin: 30 to 80%
Reactive diluent system: 70 to 20%

The resins which can be cured by the polymerization of the double >C=CH₂ which can be employed for implementing the process according to the invention may have one or more unsaturations, preferably 0.2 to 5 equivalents of unsaturations per kg of resin. More precisely, the resins which are suitable for implementing the invention include polyester/acrylic resins, polyether/acrylic resins and polycarbonate/acrylic resins which are obtained by the reaction of acrylic or methacrylic acid with a polyhydric alcohol, unsaturated urethane resins resulting from the reaction of a polyhydric alcohol with an unsaturated ester containing an active hydrogen via an aliphatic or aromatic polyisocyanate and epoxy/acrylic resins which may be obtained by the reaction of acrylic or methacrylic acid with epoxide compounds.

As examples of unsaturated esters containing an active hydrogen, there may be mentioned hydroxyalkyl acrylates or methacrylates and, in particular, 2-hydroxyethyl acrylate or methacrylate and 2-hydroxypropyl acrylate or methacrylate.

Among suitable polyisocyanates, there may be mentioned, by way of indication, the following compounds: 2,4- and 2,6-diisocyanatotoluene, 2,4- and 2,6-diisocyanato-1-methylcyclohexane, 4,4'- diisocyanatodicyclohexylmethane, diisocyanatoisophorone, hexamethylene diisocyanate, diisocyanato-2,2,4-trimethylhexamethylene, biurets based, for example, on hexamethylene diisocyanate, and their mixture.

Among polyhydric alcohols which are suitable for the present invention, there may be mentioned:
- hydroxylated polyepichlorohydrins,
- hydroxylated polybutadienes,
- hydroxytelechelic polycarbonates obtained by the phosgenation or the transesterification of aliphatic, alicyclic or aromatic diols or triols, either alone or as mixtures,
- polycaprolactones,
- hydroxytelechelic polyesters obtained by the reaction of a polyhydric alcohol (such as ethylene glycol, diethylene glycol, glycerol, butane-1,3-diol, propoxylated bisphenol A, sorbitol and the like) with a polycarboxylic acid or its anhydride or its ester (such as adipic acid and maleic, succinic or terephthalic anhydride),
- polyether polyols obtained by the addition of an alkylene oxide (such as ethylene oxide, propylene oxide or tetrahydrofuran) with the polyhydric alcohol as mentioned above,
- polyether esters such as polydiethylene glycol adipate and polytriethylene glycol adipate in which the polyether replaces a part of the glycol, and
- hydroxytelechelic polyurethanes formed starting with polyhydric alcohols as mentioned above and polyisocyanates as those mentioned above.

Among suitable epoxide compounds, there may be mentioned, for example, diglycidyl ether of bisphenol A (DGEBA).

For implementing reasons, it is preferable to choose linear resins. It is also preferable that these resins have a molecular weight of between 600 and 10,000.

In order to implement the process according to the invention, the composition containing the resin and the reactive diluent system is radiation crosslinked after it is applied to the support to be coated in the form of a thin film, by a means known per se. The thickness is preferably less than 0.2 mm.

As radiation, electromagnetic radiation, an electron bombardment or a nuclear radiation may, for example, be employed.

A UV radiation is preferably employed, in the presence of a photoinitiator.

As non-limiting examples of photoinitiators, there may be mentioned benzoin ethers and phenone derivatives such as benzophenone or diethoxyacetophenone, alone (for example the photoinitiator marketed by CIBA under the registered trade mark "IRGACURE 651" or the photoinitiator marketed by MERCK under the registered trade mark "DAROCUR 1116") or in combination with a tertiary amine, for example methyldiethanolamine.

A preferred method of implementing the invention consists in passing the support coated with the composition under a UV lamp, at a desired speed.

The composition employed for implementing the process according to the invention may contain all the additives which are commonly used in coating compositions which can be radiation crosslinked, especially agents for adjusting the gloss of the coating surface, surfactants, fillers or colours.

The examples below illustrate the invention without, however, limiting it.

EXAMPLE 1

Synthesis of the Acrylate of Isopropyl Betahydroxyethylcarbamate

This synthesis is carried out in 2 stages:

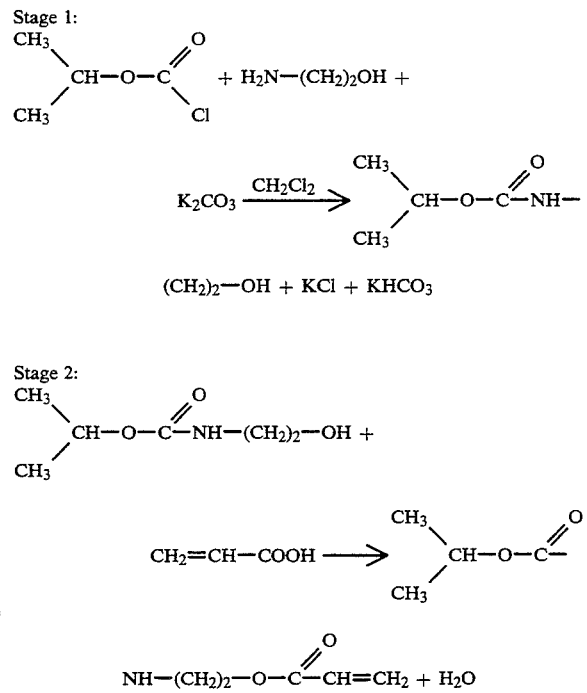

Stage 1

The following are mixed in a 50 l reactor carrying a jacket through which ethylene glycol at −10° C. is circulated:
- 25 l of methylene chloride
- 6900 g (50 moles) of potassium carbonate
- 5 l of water
- 3202 g (52.5 moles) of ethanolamine.

The mixing temperature is of the order of 0° C. 6125 g (50 moles) of isopropyl chloroformate are then added gradually.

After filtering and decanting the phases, the organic phase is recovered and neutralized with water in order to remove therefrom the traces of potassium salts formed. After evaporating off the methylene chloride, 6300 g of isopropyl beta-hydroxyethylcarbamate, which corresponds to a yield of 86% are obtained. The product was identified by IR spectrometry and NMR spectrometry and its purity (97%) was determined chemically (hydroxyl content and nitrogen content).

Stage 2

The following are mixed, at ambient temperature and with stirring, in a 20 l reactor carrying a jacket through which oil is circulated:
- 3381 g (23 moles) of isopropyl beta-hydroxyethylcarbamate
- 1740 g (24.15 moles) of acrylic acid
- 4 l of toluene
- 2.3 g of para-methoxyphenol.

The temperature is raised to 75° C. by circulating hot oil in the jacket of the reactor. 360 g (3.68 moles) of 98% sulphuric acid are then added. A partial vacuum is created within the reactor so as to recover azeotropically the water water formed during the esterification reaction.

After approximately 4 h of reaction, 450 g (4.6 moles) of sodium carbonate are added in order to remove any residual acidity from the medium.

The reaction medium is then washed in order to solubilize the salts formed during the reaction with sodium carbonate.

The toluene and volatile products are evaporated off under reduced pressure. 3136 g of acrylate of isopropyl beta-hydroxyethylcarbamate, identified by IR spectrometry and NMR spectrometry, are thus obtained, which corresponds to a yield of 68% relative to the isopropyl beta-hydroxyethylcarbamate.

The purity of the product, which is greater than 90%, was determined by potentiometry and elemental analysis.

It is a clear liquid with the following physical properties:

density: 1.11
refractive index at 25° C.: 1,455
boiling point: 115° C. at 2 mm Hg
viscosity at 25° C.: 70 mPa.s.

EXAMPLES 2 TO 20

Production of coatings with compositions containing the acrylate of isopropyl beta-hydroxyethylcarbamate as reactive diluent. Comparisons with coatings obtained according to known processes.

A/ EXAMPLES 2 TO 7

Comparison of Reactivity

Tests are carried out with the diacrylic urethane resin marketed by SNPE under the registered trade mark "ACTILANE 20" (Act. 20) of molecular weight approximately 1300, obtained starting with:

2 n moles of 2-hydroxyethyl acrylate
2 n moles of isophorone diisocyanate (IPDI)
n moles of polyethylene glycol adipate.

The photo initiator employed is that marketed by CIBA under the registered trade mark "IRGACURE 651" (Irg. 651).

In Example 2, the reactive diluent is a bifunctional acrylic compound, hexanediol diacrylate (HDDA).

In Example 3, the reactive diluent is a monofunctional acrylate of the abovementioned formula (EDGA).

In Example 4, the reactive diluent is N-isopropyl carbamoyloxyethylacrylate of formula (diluent no. 1)

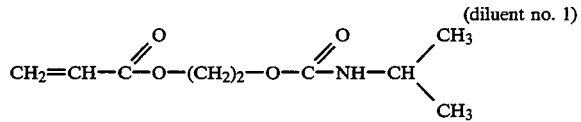

In Example 5, the reactive diluent is, according to the invention, the acrylate of isopropyl beta-hydroxyethylcarbamate (diluent no. 2).

In Example 6, the reactive diluent is, according to the invention, a mixture of acrylate of isopropyl beta-hydroxyethylcarbamate (diluent no. 2) and HDDA.

In Example 7, the reactive diluent is a monofunctional acrylate, phenoxyethyl acrylate (P.E.A.).

After mixing the resin, the reactive diluent system and the photoinitiator, a film of the composition thus obtained is deposited on a support which is then passed at different speeds under a UV lamp which has a linear power of 80 W/cm, along a direction perpendicular to the direction formed by the length of the lamp.

The proportion of the various constituents in the compositions, expressed in parts by weight, and the speed of passing under the UV lamp required for the coating to be dried to touch are given in Table 1 below:

TABLE 1

| Constituents | Example no. | | | | | |
|---|---|---|---|---|---|---|
| | 2 | 3 | 4 | 5 | 6 | 7 |
| Act. 20 | 50 | 50 | 50 | 50 | 50 | 50 |
| HDDA | 50 | — | — | — | 25 | — |
| EDGA | — | 50 | — | — | — | — |
| PEA | — | — | — | — | — | 50 |
| Diluent no. 1 | — | — | 50 | — | — | — |
| Diluent no. 2 | — | — | — | 50 | 25 | — |
| Irg. 651 | 5 | 5 | 5 | 5 | 5 | 5 |
| Speed in m/min | 10 | 1.25 | 3.3 | 10 | 10 | 5 |

Although the reactive diluent employed in the present invention (diluent no. 2) is monofunctional, it has a reactivity similar to that of the bifunctional monomers used until now.

The reversal of the carbamate unit relative to the known reactive diluent (diluent no. 1) described in EP-147,172 causes, in an unexpected way, a very significant increase reactivity.

B/ EXAMPLES 8 TO 11

Comparison of Mechanical Properties of the Coatings Obtained

The tests are carried out as in Examples 2 to 7.

Table 2 below specifies the nature and the proportion by weight of the constituents in the compositions employed as well as the results obtained in each test.

Determinations of mechanical properties were carried out using standardized H3 test-pieces, in the form of a 150 μm film which is dried and stabilized for 3 days.

The photoinitiator employed is that marketed by MERCK under the registered trade mark "DAROCUR 1116".

TPGDA means tripropyleneglycol diacrylate. It is a known reactive diluent which is frequently used.

TABLE 2

| Constituents | Example no. | | | |
|---|---|---|---|---|
| | 8 | 9 | 10 | 11 |
| Act. 20 | 70 | 70 | 70 | 70 |
| EDGA | 30 | — | — | — |
| PEA | — | 30 | — | — |
| TPGDA | — | — | 30 | — |
| Diluent no. 2 | — | — | — | 30 |
| Darocur 1116 | 4 | 4 | 4 | 4 |
| Breaking stress (in MPa) | 5 | 20 | 35 | 15 |
| Breaking elongation (in %) | 27 | 79 | 22 | 93 |

The reactive diluent (diluent no. 2) employed within the scope of the present invention enables films with a higher breaking elongation to be obtained, which results, in practice, in a greater flexibility.

C/ EXAMPLES 12 TO 19

Comparison of Viscosity of the Compositions

Table 3 below specifies the nature and the proportion by weight of the constituents in the composition studied as well as the results obtained for viscosity (rotating spindle method at 25° C.).

TABLE 3

| Constituents | Example no. | | | | | | | |
|---|---|---|---|---|---|---|---|---|
| | 12 | 13 | 14 | 15 | 16 | 17 | 18 | 19 |
| Act. 20 | 80 | 80 | 80 | — | — | — | 50 | 50 |
| TPGDA | 20 | — | — | 100 | — | — | — | — |
| TMPTA | — | 20 | — | — | 100 | — | 50 | — |
| Diluent no. 2 | — | — | 20 | — | — | 100 | — | 50 |
| Viscosity (in mPa · s) | $10^5$ | $10^6$ | 130000 | 15 | 80 | 70 | 12000 | 5700 |

These results demonstrate the excellent and surprising diluting power of the reactive diluent no. 2 according to the invention, In fact, it is observed in an unexpected way that on the one hand, a mixture with the resin Act. 20 (Example 14) which has a viscosity of the same order of magnitude (slightly greater) as that of the mixture in Example 12 is obtained, whereas the viscosity of the reactor diluent no. 2 is 5 times greater than that of TPGDA and, on the other hand, mixtures with the resin Act. 20 (Examples 14 and 19) with a viscosity which is very significantly less than those for the corresponding mixtures (Examples 13 and 18) with TMPTA are obtained, whereas the viscosity of the reactive diluent no. 2 is of the same order of magnitude as that of TMPTA.

D/ EXAMPLE 20

Study of the Light Stability of a Composition Employed in the Process According to the Invention 50/50 mixture of Act. 20 and diluent no. 2 has a yellowing index of less than 1 after 500 hours under a QUV panel.

EXAMPLES 21 TO 32

Production of coatings with compositions containing the acrylate of beta-hydroxyethyloxazolidone as reactive diluent (diluent no. 3). Comparison with coatings obtained according to known processes.

A/ EXAMPLES 21 TO 25

Comparison of Reactivity of the Compositions and the Hardness of Coatings

These tests were carried out as in Examples 2 to 7.
Table 4 below gives the data and the results relating to each example.

TABLE 4

| Constituents | Example no. | | | | |
|---|---|---|---|---|---|
| | 21 | 22 | 23 | 24 | 25 |
| Act. 20 | 50 | 50 | 50 | 50 | 50 |
| HDDA | — | 50 | — | 25 | 25 |
| EDGA | 50 | — | — | 25 | — |
| Diluent no. 3 | — | — | 50 | — | 25 |
| Irg. 651 | 5 | 5 | 5 | 5 | 5 |
| Speed m/min | 1.25 | 10 | 10 | 10 | 20 |
| Persoz hardness | 40 | — | 80 | — | 200 |

Although the reactive diluent employed as the only monomer in the present invention (diluent no. 3) is monofunctional, it has a reactivity similar to that of the bifunctional monomers used until now.

Moreover, an unexpected synergistic effect is observed when diluent 3 is mixed with HDDA, the reactivity under these conditions being greater than that obtained with each of the 2 reagents used separately.

With regard to hardness, the replacement of EDGA, which is the commonly used monofunctional reagent, with the monofunctional reactive diluent no. 3 according to the invention enables the hardness to be doubled, at a given flexibility.

B/ EXAMPLES 26 TO 29

Comparisons of Mechanical Properties of the Coatings Obtained

The tests are carried out as in Examples 8 to 11.
Table 5 below gives the data and the results relating to each example.

TABLE 5

| Constituents | Example no. | | | |
|---|---|---|---|---|
| | 26 | 27 | 28 | 29 |
| Act. 20 | 70 | 70 | 70 | 70 |
| EDGA | 30 | — | — | — |
| PEA | — | 30 | — | — |
| TPGDA | — | — | 30 | — |
| Diluent no. 3 | — | — | — | 30 |
| Darocur 1116 | 4 | 4 | 4 | 4 |
| Breaking stress (in MPa) | 5 | 20 | 35 | 28 |
| Breaking elongation (in %) | 27 | 79 | 22 | 82 |

It is observed that the diluent no. 3 according to the invention enables the best compromise between breaking stress and breaking elongation to be obtained.

C/ EXAMPLE 30 AND 31

Comparison of Viscosity of the Compositions

Table 6 below specifies the nature and the proportion by weight of the constituents in the compositions studied as well as the results obtained for viscosity (rotary spindle method at 25° C.), in comparison with the Examples 11, 12, 14 and 15 mentioned above.

TABLE 6

| Constituents | Example no. | | | | | |
|---|---|---|---|---|---|---|
| | 30 | 31 | 12 | 13 | 15 | 16 |
| Act. 20 | 80 | — | 80 | 80 | — | — |
| TPGDA | — | — | 20 | — | 100 | — |
| TMPTA | — | — | — | 20 | — | 100 |
| Diluent no. 3 | 20 | 100 | — | — | — | — |
| Viscosity (in mPa · s) | 135000 | 50 | 100000 | 1000000 | 15 | 80 |

These results demonstrate the excellent and surprising diluting power of the reactive diluent no. 3 according to the invention. In fact, it is observed, in a surprising way, that a mixture with the resin Act. 20 (Example 30) which has, on the one hand, a viscosity of the same order of magnitude (slightly greater) as that for the mixture in Example 12 to be obtained whereas the viscosity of the reactive diluent no. 3 is more than 3 times greater than that of TPGDA and, on the other hand, a viscosity which is 6 times lower than that of the corresponding mixture (Example 13) with TMPTA to be obtained, whereas the viscosity of the reactive diluent no. 3 is only about half that of TMPTA.

D/ EXAMPLE 32

Study of Light Stability of a Composition Employed in the Process According to the Invention A 50:25 mixture of Act. 20 and diluent no. 3 has a yellowing index of less than 2 after 500 h under a QUV panel.

EXAMPLES 33 AND 34

Production of a coating with a composition containing the methacrylate of isopropyl beta-hydroxyethylcarbamate (diluent no. 4) as reactive diluent. Comparison of reactivity with a composition containing N-isopropyl carbamoyloxyethyl methacrylate (diluent no. 5).

These tests were carried out as in Examples 2 to 7.

Table 7 below gives the data and the results relating to each example.

TABLE 7

| Constituents | Example no. 33 | Example no. 34 |
|---|---|---|
| Act. 20 | 50 | 50 |
| Diluent no. 4 | 50 | — |
| Diluent no. 5 | — | 50 |
| Irg. 651 | 5 | 5 |
| Speed m/min | 3.0 | 2.2 |

The reversal of the carbamate unit relative to the known reactive diluent no. 5 results in an increase in reactivity.

We claim:

1. Process for the production of coatings by radiation crosslinking, comprising:
   (a) mixing a mixture consisting of: (i) between 30 and 80% by weight of a linear radiation cross-linkable oligomer or mixture of oligomers having two double bonds $>C=CH_2$ and a molecular weight between 600 and 10,000, which can be cured by the polymerization of the double bonds $>C=CH_2$, said oligomer being a member selected from the group consisting of polyester/acrylic oligomers, epoxy/acrylic oligomers, polycarbonate/acrylic oligomers, and unsaturated urethane oligomers resulting from the reaction of a polyhydric alcohol with an unsaturated ester containing an active hydrogen via an aliphatic or aromatic polyisocyanate, said polyhydric alcohol being a member selected from the group consisting of hydroxylated polyepichlorohydrins, hydroxylated polybutadienes, hydroxytelechelic polycarbonates obtained by the phosgenation or the transesterification of aliphatic, alicyclic or aromatic diols or triols, polycaprolactones, hydroxytelechelic polyesters obtained by the reaction of a polyhydric alcohol with a polycarboxylic acid or anhydride thereof or ester thereof, polyether polyols obtained by the addition of ethylene oxide, propylene oxide or tetrahydrofuran with a polyhydric alcohol, polyether esters, and hydroxytelechelic polyurethanes, (ii) between about 70 and 20% by weight of a reactive diluent corresponding to the general formula (I)

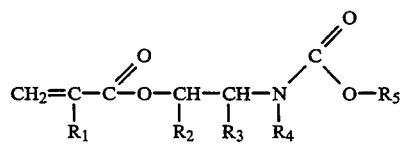

in which
   $R_1$ represents a hydrogen atom or a methyl group,
   $R_2$ and $R_3$ represent a hydrogen atom, or an alkyl chain containing 1 to 4 carbon atoms, or alternatively, $R_2$ and $R_3$ form, with the carbon atoms to which they are attached, an alkylene ring containing 5 or 6 carbon atoms,
   $R_4$ represents a hydrogen atom, or an alkyl chain containing 1 to 4 carbon atoms, or an optionally substituted phenyl group,
   $R_5$ represents an isopropyl group,
   or alternatively, $R_4$ and $R_5$ form, with the carbamate group to which they are attached, an oxazolidone ring, and (iii) a photoinitiator, whereby said oligomer, diluent and photoinitiator total 100% by weight of said mixture;
   (b) applying said mixture to a support; and
   (c) UV radiation crosslinking said applied mixture.

2. Process according to claim 1, wherein $R_2$ and $R_3$ represent a hydrogen atom.

3. Process according to claim 1, wherein $R_4$ represents a hydrogen atom.

4. Process according to claim 1, wherein said reactive diluent corresponding to the general formula (I) is chosen from the group consisting of the acrylate of beta-hydroxyethyloxazolidone and the acrylate of isopropyl beta-hydroxyethylcarbamate.

5. Process according to claim 1, wherein said photoinitiator is present in an amount of about 4% to 5% by weight.

* * * * *